US009255644B1

(12) United States Patent
Voigt

(10) Patent No.: US 9,255,644 B1
(45) Date of Patent: Feb. 9, 2016

(54) PROMPT HOT WATER AND WATER CONSERVATION SYSTEM AND METHOD

(76) Inventor: William R. Voigt, Essexville, MI (US)

(*) Notice: Subject to any disclaimer, the term of this patent is extended or adjusted under 35 U.S.C. 154(b) by 530 days.

(21) Appl. No.: 13/421,861

(22) Filed: Mar. 16, 2012

Related U.S. Application Data

(60) Provisional application No. 61/485,122, filed on May 11, 2011.

(51) Int. Cl.
F24D 17/00 (2006.01)
F16K 5/06 (2006.01)

(52) U.S. Cl.
CPC ..................... F16K 5/0657 (2013.01)

(58) Field of Classification Search
USPC .................. 137/513.5, 519.5, 564; 122/19.1; 126/362.1, 638, 639
See application file for complete search history.

(56) References Cited

U.S. PATENT DOCUMENTS

| 1,969,460 | A | * | 8/1934 | Glenn | 126/362.1 |
| 2,255,460 | A | * | 9/1941 | Weaver | 137/564 |
| 2,915,080 | A | * | 12/1959 | Holmes | 137/564 |
| 2,973,010 | A | * | 2/1961 | Lyle | 137/564 |
| 3,097,661 | A | * | 7/1963 | Lee | 137/564 |
| 3,556,124 | A | * | 1/1971 | Walton | 137/564 |
| 3,771,556 | A | * | 11/1973 | Gifford | 137/533.11 |
| 3,861,415 | A | * | 1/1975 | Larsen | 137/519.5 |
| 3,929,153 | A | * | 12/1975 | Hasty | 137/564 |
| 4,346,731 | A | * | 8/1982 | Sigworth, Jr. | 137/564 |
| 4,364,411 | A | * | 12/1982 | Payton et al. | 137/513.5 |
| 4,409,959 | A | * | 10/1983 | Sigworth, Jr. | 137/564 |
| 4,655,247 | A | * | 4/1987 | Westra et al. | 137/519.5 |
| 4,917,142 | A | * | 4/1990 | Laing et al. | 137/564 |
| 4,945,947 | A | * | 8/1990 | Westra et al. | 137/519.5 |
| 5,331,996 | A | * | 7/1994 | Ziehm | 137/14 |
| 5,671,771 | A | * | 9/1997 | Brandel | 137/564 |
| 5,785,083 | A | * | 7/1998 | Tang | 137/533.13 |
| 5,918,625 | A | * | 7/1999 | Ziehm | 137/564 |
| 6,145,808 | A | * | 11/2000 | Hickman | 137/563 |
| 6,161,567 | A | * | 12/2000 | Ziehm | 137/357 |
| 6,779,552 | B1 | * | 8/2004 | Coffman | 137/337 |
| 7,077,155 | B2 | * | 7/2006 | Giammaria | 137/563 |

* cited by examiner

Primary Examiner — John Rivell
(74) Attorney, Agent, or Firm — Robert L. Farris; Farris Law, P.C.

(57) ABSTRACT

The prompt hot water and water conservation system includes a hot water supply pipe connected to a hot water heater outlet. A discharge faucet is connected to the supply pipe. A return pipe is connected to the supply pipe and to a hot water tank drain. The return pipe carries cooled water to the drain for reheating. Reheated water circulates into the supply pipe. A flow control device, in the return pipe, includes a chamber that houses a sphere. Return water flow moves the sphere toward a stop and permits unimpeded movement of water into the tank drain for reheating. When the faucet is opened, water flows from the tank drain into the flow control device. The sphere is moved to contact a small end of the chamber and substantially stop flow through the return pipe. Water is circulated through the system by increased density of cooled water.

8 Claims, 4 Drawing Sheets

PROMPT HOT WATER AND WATER CONSERVATION SYSTEM AND METHOD

CROSS REFERENCE TO RELATED APPLICATION

This application claims the benefit of the filing date of U.S. Provisional Application No. 61/485,122, titled PROMPT HOT WATER SYSTEM AND METHOD. Filed May 11, 2011.

TECHNICAL FIELD

The invention is in a convection hot water system that provides prompt delivery of hot water from a central water heater for use at one or more remote locations and conserves water.

BACKGROUND OF THE INVENTION

The hot water system in many homes, offices and other facilities includes a hot water heater that receives cold water from a water source, heats the water and delivers the heated water through pipes to a location where heated water is needed. The hot water heater is often located on a lower level of such facilities near where potable water is received. Kitchens and bathrooms are generally located on upper levels and may be remote from the hot water heater.

A hot water faucet is opened to obtain hot water from a hot water heater. Unless hot water was obtained from the faucet a short time earlier, water must run from the faucet for a sufficient time to remove all the cold water from the pipe between the faucet and the hot water heater plus heating the pipe. The cold water discharged from the hot water faucet passes into a drain pipe and to a sewer system. The quantity of water that is lost can be significant. Insulation on the pipe can keep hot water in the pipe and the pipe at least warm for some period of time. However, insulation will not keep the water and pipe hot for an extended period of time.

Potable water is generally pumped from a water source by pumps. The pumps also maintain pressure in a water system or elevate water to a storage tower. The water is generally filtered and treated with some chemicals to insure that water born organisms do not make people sick. In a few areas, salt water is evaporated and then condensed to provide potable water. This pumping, filtering and chemical treatment of water is expensive. The heat required to distill salt water is also expensive. Sanitary sewer systems, where available, are constructed and operated by fees added to water bills thereby further increasing the cost of water.

Instant or nearly instant hot water may be obtained by adding a flow through heater to the hot water pipe near the hot water faucet. These electric heaters work well to heat a relative small quantity of water for making a hot drink or some food products. Such heaters have relatively low capacity. The purchase, installation and operation of an instant or nearly instant hot water heater is expensive. However, such heaters may reduce water usage. Such reduction of water usage is probably more significant than most home owners believe. However installation and operating costs of a flow through heater are significant and may exceed the cost savings due to water use reduction.

Instant or nearly instant hot water may also be provided by a pump or pumps that circulate water through a hot water supply pipe and back to the hot water heater. Such pumps run constantly and require a significant amount of electricity. These water circulating systems are generally reliable. The water that is returned to the water heater has cooled somewhat in the hot water supply line. The return flow of water by the pump is through a cold water supply pipe in some pump systems. After the pump runs for a period of time, there is hot water in a portion of the cold water supply pipe. Opening a cold water faucet will in some cases result in the discharge of hot water. Hot water in the cold drinking water is undesirable. Some chemicals employed to treat potable water will become gases at an elevated temperature and atmospheric pressure. The gases will separate from the water. The separated gases may be harmful to people and animals. Although the need for hot water may only occur a few times each day, the pump circulates water continuously.

Pumps employed to return cooled hot water to a hot water heater produce pressure changes in a pipe system that may result in vibrations and noise. Noise generated by a pump resonates throughout the plumbing system and often is objectionable. Although the need for hot water may only occur a few times each day, the pump cycles, as required, 24 hours per day.

A recent innovation used to provide hot water is the high flow, point of use water heaters that can be placed adjacent to areas such as showers and laundries that require a large quantity of hot water in a very limited time. They produce hot water almost instantly by the rapid infusion of large quantities of energy. They work well, and reduce the amount of cooled hot water discharges to the drain. Often they are secondary serving only a portion of the building, the main source being a standard hot water heater. The purchase price may be two to three times the cost of a standard hot water heater. Infrastructure is expensive due to the required capacity of 180,000 B.T.U.s of energy at an instant as need basis. If the high capacity point of use heater is selected, there is additional cost to provide venting of exhaust gas, and a larger gas meter to provide that fuel.

To overcome the delay in obtaining hot water, people often increase the thermostatic control on the hot water heater to the maximum or near maximum setting, thereby increasing the output temperature of water from a relatively safe one hundred and thirty degrees (130°) Fahrenheit to a potentially scalding temperature of one hundred and sixty degrees (160°). Skin exposure to 160° water can result in serious scalding in as little as one second. New regulations in some areas limit delivered water temperature through a faucet to 110 degrees Fahrenheit. The majority of grandfathered faucets in use today do not provide this protection, predictably resulting in many serious injuries. It will be years before all of the grandfathered faucets are replaced to prevent delivery of hot water above a regulation temperature.

SUMMARY OF THE INVENTION

The natural resource conserving prompt hot water system reduces potable water usage by reducing the quantity of cooled hot water discharged from a hot water faucet. The water conserving prompt hot system returns hot water that has cooled in a hot water pipe to the bottom of a hot water storage tank or hot water heater through a dedicated line without a pump and also limits the flow of cold water into the hot water supply system. The reduction in the quantity of cold water entering the hot water heater can reduce the energy required to heat water entering a home or building.

The natural resource conserving prompt hot water system, as described above operates without a pump with a normal temperature change in the hot water supply pipe and the return pipe and an elevation change as low as the distance between the hot water discharge opening and the drain pipe in a standard upright hot water heater. A two story building with a basement will have a substantially larger pressure change urging water flow in the return pipe. The return flow rate may be reduced by partially closing the metering valve.

The natural resource conserving prompt hot water system minimizes the quantity of water that is discarded, through a drain, before water at a desired elevated temperature is available. The system minimizes the energy required to reheat water returned to a hot water tank with partially cooled hot water. Energy is also reduced by substituting the quantity of cold water added to the hot water tank with partially cooled hot water. Energy is also reduced by insulating the hot water supply pipe and at least a portion of a return pipe.

The hot water tank includes a tank body, a tank top end and a tank bottom end. A water inlet opening in the hot water tank is connected to a water supply pipe. The water supply pipe generally supplies cold water from a water utility or a private water well. The water received from the water supply pipe is under pressure.

A hot water supply pipe has an inlet end connected to a hot water discharge opening in the hot water tank. The hot water supply pipe extends away from the hot water tank to a supply pipe remote end. This hot water supply pipe functions as a manifold. Pipe inside diameter depends on a number factors include maximum expected flow, pressure drops in the system and government ordinances. A manifold, for hot water in most residential construction in North America, employs half inch inside diameter pipe or three fourths inch inside diameter pipe. In some hot water systems there can be a change in the diameter of the hot water supply pipe between the inlet end and the remote end.

A plurality of point of use pipes are connected to the hot water supply pipe. A discharge faucet is connected to each point of use pipe and controls the flow of hot water from one of the point of use pipes. One or more discharge faucets can be open at a given time. In some hot water systems there may be only one point of use pipe.

A return pipe includes a return pipe inlet end that is connected to the hot water supply pipe or a nearby convenient branch. The connection is generally adjacent to the supply pipe remote end. However, the connection may be located in any chosen location where the connection can be made. A return pipe discharge end is connected to the drain opening in the tank body. Hot water tanks are provided with a drain opening near the tank bottom. The drain opening is provided for removing sediment from the tank. The drain opening is also used to empty the hot water tank if necessary. The return pipe discharge end may be connected to the drain valve. Drain valves have a threaded end for connecting a hose. It is generally possible to replace the drain valve and valve pipe with a short nipple. The return pipe discharge end may be connected to the nipple by suitable couplers if desired.

The hot water supply pipe, the return pipe and the hot water tank form a water circulation system. The water entering the return pipe from the hot water supply pipe is returned to the bottom of the hot water tank. Water removed from the hot water supply pipe, through the return pipe is replaced by hot water from the hot water tank. Water is circulated from the hot water discharge opening in the hot water tank, through the hot water supply tank, through the return pipe and back into the hot water tank. None of the recirculated water is lost. This water circulation results from the increase in water density as the temperature decreases as the hot water moves through the hot water supply pipe and return pipe and the decrease in elevation as the cooled water moves downward to the circuit bottom and into the drain opening. A pumpless circulation system is created that maintains hot water in the hot water supply pipe. The return pipe may have a return pipe inside diameter that is substantially the same or less than the supply pipe inside diameter to the hot water supply pipe. The relative large inside diameter of the return pipe is desirable to limit impedance to flow in the return pipe. However, an inside pipe diameter that is about sixty seven percent of the supply pipe inside diameter has been found to function well in some buildings.

A directional flow control device is provided any place between the hot water supply pipe connection to the return pipe and the drain opening in the tank body. The directional flow control device substantially limits the flow of cold water through the return pipe and into the hot water supply pipe in response to the opening of one or more of the discharge openings from the hot water supply pipe.

The directional flow control device includes a body. The body includes an inlet bore that receives return water. A conical bore portion in the body includes an inlet end with an inlet bore that joins a small diameter end of the conical bore portion. A cylindrical bore portion in the body joins a large diameter end of the conical bore portion. A plug includes a plug tubular portion. An outlet bore passes through the plug tubular portion. A cylindrical plug portion is received in the cylindrical bore portion and fixed to the body to form a chamber. An axis of the directional flow control device is coaxial with the inlet bore, the conical bore portion, the cylindrical bore portion and the outlet bore through the plug.

A sphere positioned in the chamber of the directional control device is movable by water flow in a first direction toward at least one projection in the chamber. The projection limits movement of the sphere toward the outlet bore and permits free flow of water through the chamber. The sphere is movable by water flow in a second direction generally parallel to the axis and into the conical bore portion in response to opening one of the hot water discharge faucets. The sphere is moved, by water in the second direction, toward the small diameter end of the conical bore portion and substantially blocks the flow of water through the inlet bore and into the hot water supply pipe.

The conical bore portion includes a conical wall surface that extends from the small diameter end to the large diameter end of the conical bore portion at an angle relative to the axis of more than twenty degrees (20°).

There sphere may be a glass member with a high density. With the high density sphere, the inlet bore is at the same elevation as the outlet bore and the axis of the chamber is horizontal. Substantial water flow from a hot water discharge faucet may be required to move a high density sphere into the conical bore small diameter end.

A low density sphere made of a material such as nylon will move with water flow into the directional flow control device from the drain opening in the hot water tank or from the hot water supply pipe. The axis of the flow control device may be vertical, horizontal, or any position between horizontal and vertical.

A low density sphere may stick in the conical portion of the chamber due to the minimal density change with liquid water temperature change. The low density sphere remains free to move into and out of the conical bore portion by increasing the angle of the conical wall surface of the conical bore portion relative to the axis from twenty degrees to thirty degrees or more.

Cold water entering the chamber from the drain opening in the hot water tank may increase the pressure in the chamber and hold the sphere in the conical small end. A fluid bypass between the sphere and the conical bore portion equalizes pressure or the downstream side and the upstream side of the sphere.

The fluid bypass between the sphere and the conical bore portion is provided by three ridges on the conical bore portion surface. The ridges extend radially inward toward the axis a distance of up to thirty thousands of an inch. These ridges may extend only a portion of distance to the large diameter end of the conical bore.

A valve is provided to limit the quantity of cool water passing through the return pipe and into the hot water tank.

The device operates within a pressurized environment, and functions by sensing direction of flow, not pressure. The low convective pressure (0.006 PSI) generated is too low to reliably open, shift, or close a check valve. The natural resource conserving hot water device is never totally closed.

The function to be encouraged is from the hot end of the hot water supply to the cold end. Very low impedance is applied in this direction of flow. Flow from the cold side to the hot side, such as when a supply faucet is opened disrupts this balancing process; a small flow is permitted by higher impedance. Check valves are not used, as they do not operate reliably at the low convective pressure, and eventually cause the system to fail.

Thermal change is self-regulation. As the cooled hot water in the return line cools, the density of that water in the vertical component increases, slightly increasing the convective pressure moving additional hot water from the hot water line into the return line, and eventually back into the hot water heater. As the temperature of the water in the vertical component warms, its density becomes less, thus decreasing the convective pressure slowing the flow. The Low Impedance Directional Flow Control Device senses and restricts backflow. As demonstrated in the prototype system that has operated for an extended time, the temperature in the vicinity of the metering valve is virtually constant with a variance of a few degrees.

The natural resource conserving prompt hot water system is installable by a professional plumber or by a home owner. The system conserves water and may also conserve energy for heating the water. The system conserves water by reheating water in the water supply pipe that would be discharged to a drain pipe and sewer system without the reheating system. Energy may be saved by reducing the quantity of cold water entering the hot water heater from a source outside the home or other structure. If the hot water system is not to be used for an extended period of time, the reheating system and the primary water system can both be turned off.

The method for conserving water in a prompt hot water system includes connecting a return pipe inlet end of a return pipe to a hot water supply pipe in a position remote from a hot water discharge opening in a hot water tank. A return pipe discharge end of the return pipe is connected to a drain opening in the hot water tank. The drain opening of the hot water heaters is in a bottom portion of the hot water tank. Water is forced to flow from the return pipe and into the hot water tank through the drain opening entirely by an increase in water density due to a decrease in water temperature at the return pipe discharge end.

A sphere is moved in response to water flow through a direction flow device toward a position in which flow of water, in the return pipe, through the drain opening and into the hot water tank is unimpeded.

A faucet is opened to discharge water from the hot water supply pipe. Water moves the sphere, in response to water flow from the hot water tank through the drain opening and into the return pipe, into a position in which reverse flow of water through the directional flow device is substantially reduced.

Closing the faucet to block discharge of water from the hot water supply pipe results in returning the sphere, by water flow from the hot water supply pipe and into the return pipe, to the position in which flow of water through the directional flow device is unimpeded.

The maximum water flow rate of water through the return pipe is controlled to control the minimum temperature of water entering the hot water tank through the drain opening. The flow rate through the return pipe is controlled by a valve. A minimum temperature, of water returned to the water tank for reheating, that is twenty degrees Fahrenheit below the temperature of hot water discharged from the hot water tank through the hot water discharge opening provides satisfactory operation in most residential systems.

BRIEF DESCRIPTION OF DRAWINGS

The presently preferred embodiment of the invention is disclosed in the following description and in the following drawings, wherein.

DETAILED DESCRIPTION OF THE PREFERRED EMBODIMENTS

Figure 3:
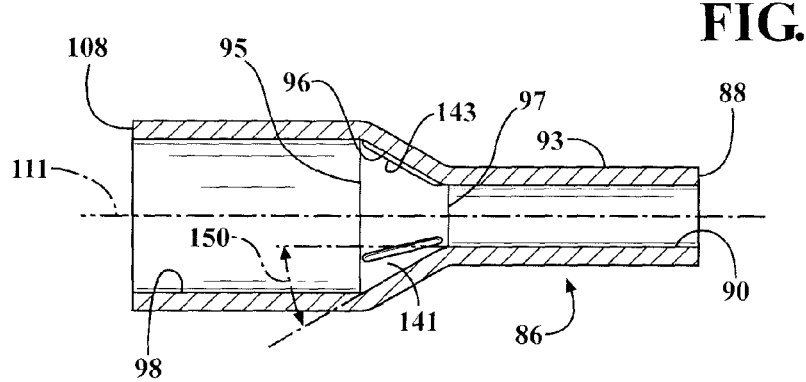
FIG. 3 is a sectional view of an injection molded body of the directional flow control device.

A typical home or office hot water system 10 includes a hot water heater 12. The hot water heater 12 includes a tank 14 with a cylindrical body 16, a top end 18 and a bottom end 20. The top end 18 includes a water inlet opening 22 and a hot water discharge opening 24. The water inlet opening 22 is connected to a water supply pipe 26 that supplies unheated potable water under pressure from a remote water source or from a nearby well. An internal pipe 28, in the tank 14, is connected to the water inlet opening 22 and discharges water through an open end 30 near the bottom end 20. A heater 32 heats water near the bottom end 20 of the tank 14. A temperature control 33, for adjusting maximum water discharge temperature is usually provided. Construction of the heater depends upon the heat source. An electric heat source would include a heater coil 21 inside the tank 14. A natural gas source would include a burner in the heater 32 under the bottom end 20 and a fire tube or tubes (not shown) extending upward from the burner and through the bottom end 20 and through the top end 18. Products of combustion discharged from a fire tube would be connected to a chimney by a pipe (not shown). A drain pipe 34 and valve 36 shown in FIG. 3 is provided near the bottom end 20 of the tank 14. The valve 36 is opened to drain water from the tank 14 and to remove any sediment collected in the tank.

Figure 5:
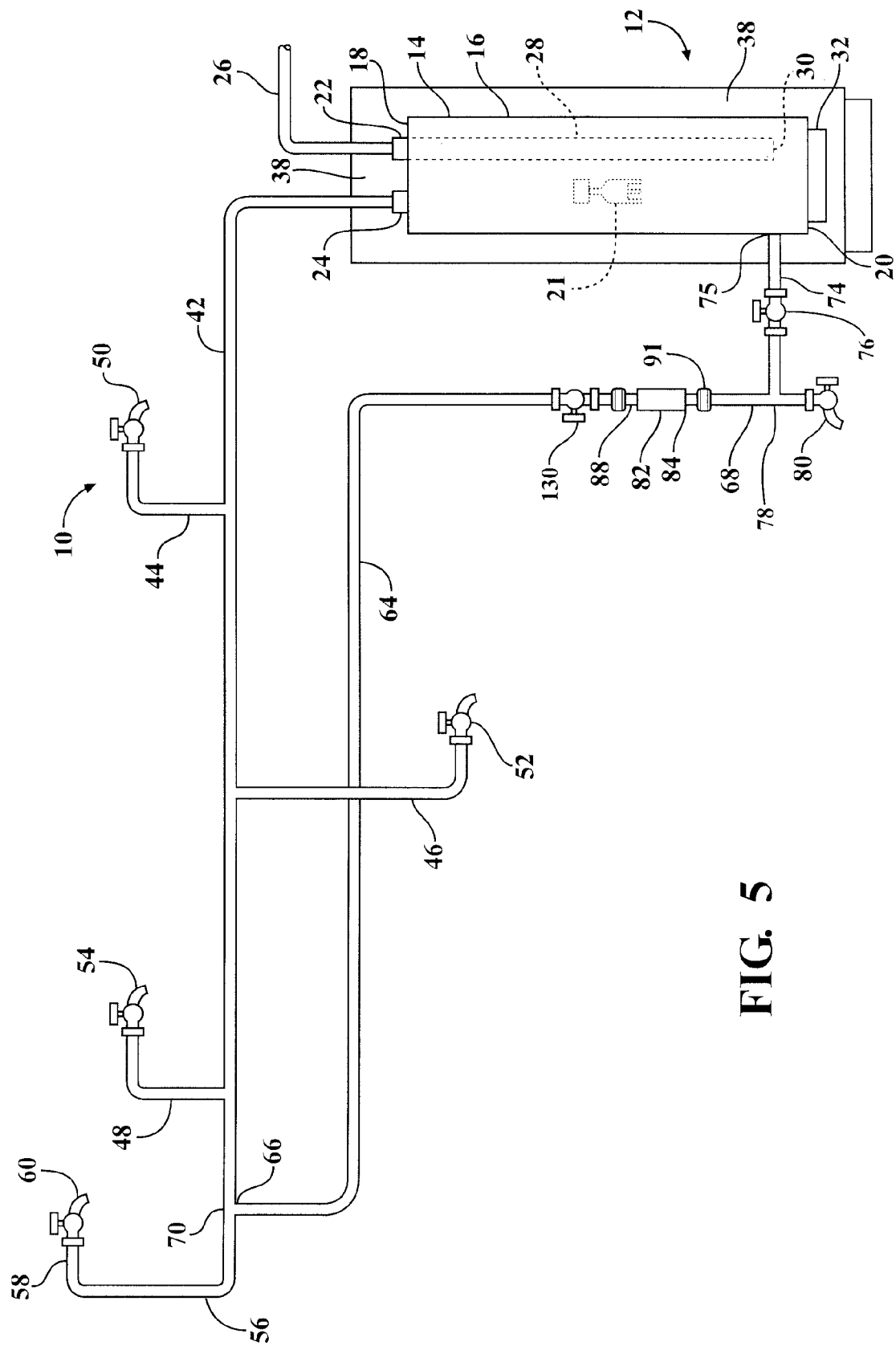
FIG. 5 is a schematic view of the prompt hot water system.

The tank 14, of hot water heater 12, is substantially encased in insulation 38 as shown in FIG. 5. The cylindrical body 16 is generally fully encased in insulation 38 when water is heated electrically. The top end 18 is encased in insulation except for the water inlet opening 22 and the hot water discharge opening 24. A metal cover 40 encases the insulation.

Hot water in the tank 14 tends to migrate toward the top end 18. Cold water in the tank 14 tends to descend toward the bottom end 20 where it is heated.

A hot water supply pipe 42 is attached to the water discharge opening 24 in the top end 18 of the tank 14. In homes and offices the supply pipe 42 is often copper. Pipes made from other material are also used.

The hot water supply pipe 42 for hot water may extend upward to the bottom of floor joists for an upper floor and then extend to a far end of the building. The hot water supply pipe 42 is supported by the floor joists and pipe hangers. Point of use pipes 44, 46 and 48 are connected to hot water supply pipe 42. Pipes 44 and 48 supply water from the hot water supply pipe 42 to a floor directly above the hot water heater 12. Pipe 46 supplies hot water from the hot water supply pipe 42 to a point of use at the same elevation as the hot water heater 12.

A faucet 50 on the point of use pipe 44 may for example supply water to a kitchen sink or a dishwasher. A faucet 52 on the point of use pipe 46 may for example supply water to a laundry washing machine on the same floor as the water heater 12. A faucet 54 on the point of use pipe 48 may for example supply water to a bathroom on the same floor as the kitchen.

A building with a second floor above the floor directly above the hot water heater 12 may be supplied with water through a vertical extension 56 to the hot water supply pipe 42 and a point of use pipe 58 as shown in FIG. 5. A faucet 60 on the point of use pipe 58 can for example supply water to a bathroom on the second floor.

The pipe 42 may have a diameter of one half inch (0.5 inch), however the plumbing code in many states requires a diameter of three fourths of an inch (0.75 inch). The larger three fourths inch diameter is often used in the hot water supply pipe 42 that becomes a manifold, to reduce the pressure drop when a faucet 50, 52, 54 or 60 is opened.

The water in the hot water supply pipe 42 cools over a period during which there is no demand for hot water. To obtain hot water from the hot water heater 12 after a period of non use, it is necessary to drain the water between the faucet from which hot water is desired and the hot water discharge opening 24 in the hot water heater 12. These pipes hold a significant quantity of water. The quantity of water in the supply pipe 42 is increased if the pipe diameter is larger than one half inch.

Water contracts and becomes denser from a temperature at which there is a change from steam to a temperature at which water becomes ice. A return pipe 64 connected to the hot water supply pipe 42, at a location near a remote end of the hot water supply pipe, and the bottom end 20 of the hot water tank 14 will create a natural return flow of cooled water to the tank 14 through the return pipe. The rate of return flow through the return pipe 64 depends on water temperature differences and the change in vertical elevation between the return pipe inlet end 66 and the return pipe discharge end 68. A temperature decrease increases water density. A vertical drop in elevation increases the pressure at the discharge end 68 of the return pipe 64.

A vertical column of water that is ninety six inches long loses 0.000288 pounds per square inch (PSI) for each degree centigrade of temperature increase. The convective system head change is 0.00576 pounds per square inch with a twenty degree centigrade temperature change. This pressure change is relatively small. The pressure change is however sufficient to create convective fluid flow due in part to the inside diameter of the return pipe 64 providing low flow impedance.

The rate of return flow through the return pipe depends on water temperature differences and the change in vertical elevational changes as stated above. There are a number of other factors that change the rate of return convection flow. These factors include the flow restrictions in the hot water supply pipe 42 and in the return pipe 64. Temperature changes in the convective fluid due to friction in the pipes 42 and 64 also change flow rates. The movement of relatively cold water from the point of use pipes 44, 46 and 48 and movement of hot water from the hot water supply pipe 42 into the point of use pipes also changes the temperature of water entering the return pipe 64. These other factors have a less significant affect on water flow in the return pipe 64 than water temperature differences and elevation changes between the inlet end 66 and the discharge end 68 of the return pipe 64. The elevation change between the hot water discharge opening 24 and the drain pipe 34 in the hot water heater 12 is sufficient to provide some return flow.

The return pipe 64 is a flexible Chlorinated Poly Vinyl Chloride (CPVC) water conveying plastic pipe, commonly called PEX. PEX is resistant to scale and chlorine, doesn't corrode or develop pinholes, can be installed quickly, and has a maximum service temperature of 200 degrees Fahrenheit. However, the return pipe 64 could also be copper or other material. The return pipe 64 may have the same inside diameter as the hot water supply pipe 42. A return pipe 64 with an inside diameter of one fourth of an inch will provide adequate flow in some hot water systems 10.

Two different plumbing assemblies exist for connecting the return pipe 64 to the bottom portion of tank 14. The plumbing assembly shown in FIG. 1 would most likely be used by the home owner or a semi skilled installer. The plumbing assembly shown in FIG. 5 would probably be used by the professional plumber.

Figure 1:
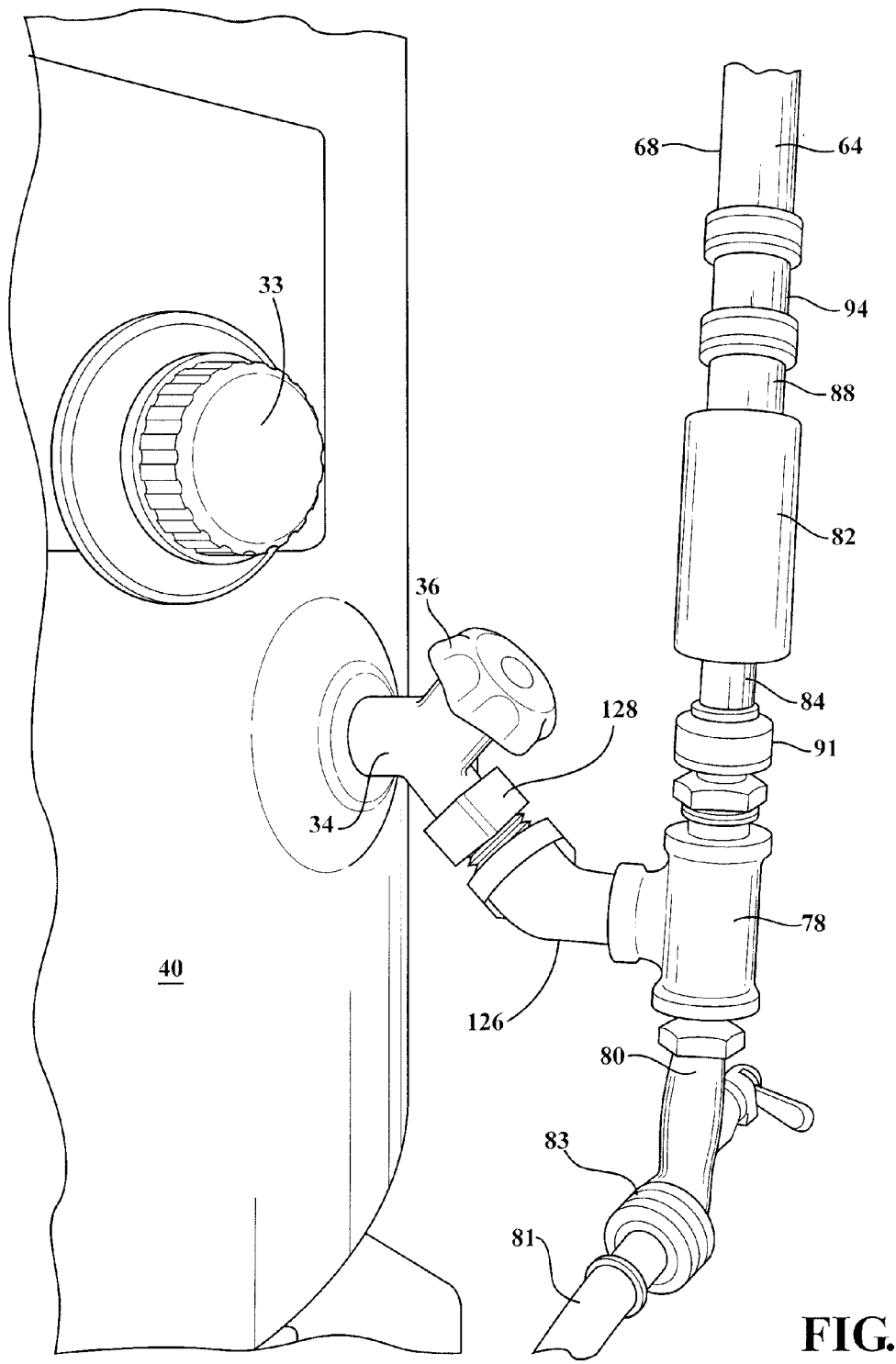
FIG. 1 is a perspective view of a water return connection to a hot water heater with parts broken away.

The return pipe inlet end 66 of the return pipe 64 is connected to the hot water supply pipe 42 by a T-coupler 70 shown in FIG. 5. If there is a vertical extension 56 to the hot water supply pipe 42, the T-coupler 70 may be moved to a position adjacent to the point of use pipe 58. The vertical extension 56 in some buildings may be inside walls and not available for connection to the return pipe 64. The pipe discharge end 68 of the return pipe 64 is connected to the drain valve 76. The metering valve 130 is connected to the hot water input end 88 of the directional flow device 82. The discharge end 84 of the directional flow device 82 is connected to the coupler 91. The coupler 91 is connected to the T-coupler 78. The T-coupler 78 is connected to the drain valve 80. The drain valve 80 is also connected to the return valve 76. The drain valve 36 as shown in FIG. 1 is connected to the hot water discharge drain pipe 34 of the hot water heater 12. Adequate flow rate in the return pipe 64 insures that the water in the hot water supply pipe 42 is nearly the same as the temperature of hot water leaving the hot water heater 12 through the hot water discharge opening 24. Significant heat loss can occur in the hot water supply pipe 42 and in the return pipe 64. To limit heat loss it is desirable to insulate the hot water supply pipe 42 and the return pipe 64. The insulation reduces heat loss and reduces the load on the heater 32 of the hot water heater 12. The hot water heater 12 maintains the temperature of water passing through the water discharge opening 24. Heat is added, by the heater 32 or the heater coil 21, to water returned by the return pipe 64 to maintain the temperature of water entering the hot water supply pipe 42 from the hot water heater 12. It is therefore desirable to return water to the hot water heater 12 from the return pipe 64 with a relatively high temperature. A decrease in the temperature difference between hot water passing through the discharge opening 24 and the water entering through drain pipe 34 or nipple 74 will decrease the pressure drop and the flow rate.

The return pipe 64 can be connected to the drain pipe 34 and drain valve 36 of the hot water heater 12 as shown in FIG. 1. The drain pipe 34 is a return water entry port. However, the drain valve 36 and the drain pipe 34 may be removed if desired. A short nipple 74, shown in FIG. 5, is screwed into the tank 14 where the original drain valve 36 and drain pipe 34 were located. A return valve 76 is attached to the nipple 74. The nipple 74 is a return water entry port. The return water entry port is a drain opening 75 in the hot water tank. A T-coupler 78 is connected to the return valve 76. A drain valve 80 is connected to the T-coupler 78. The drain valve 80 is connectable to a hose 81 with a female hose connector 83. The return pipe 64 is also connected to the T-coupler 78. The return valve 76 permits the flow of water from the return pipe 64 to be opened or closed. The drain valve 80 can be opened to drain water from the tank 14 when the return valve 76 is also open. The drain valve 80 is also opened to discharge air from the return pipe 64 when the return valve 76 is closed.

The return pipe 64 is connected to the hot water supply pipe 42 through the T-coupler 70 inserted into the hot water supply pipe 42 in a selected position as described above. A directional flow control device 82 may be connected to the supply pipe T-coupler 70. However, the return pipe 64 is connected to the T-coupler 78 as shown in FIG. 1. An inlet end 88 of the directional flow control device 82 is connected to a metering valve 130 and to the return pipe 64. The discharge end 84 of the directional flow control device 82 is connected to the short nipple 74 through a coupler 91 the T-coupler 78 and the return valve 76 shown in FIG. 5 or the drain valve 36 shown in FIG. 1. A stem elbow 126 and a female hose connector 128 connect the T-coupler 78 to the drain valve 36 as shown in FIG. 1. The drain valve 36 is also a metering valve as shown in FIG. 1.

Without the directional flow control device 82 the water supply pipe 42 and the return pipe 64 would both supply water to an open faucet 50. The water passing through the open faucet 50, or any other open faucet in a hot water supply system, could pass a mixture of hot water from the top end 18 of the tank 14 and cold water from the bottom end 20 of the tank. Cold water entering the bottom end 20 of the tank 14 through the internal pipe 28 would reduce the temperature of water flowing through the return pipe 64. The flow rate through the hot water supply pipe 42 would most likely be different than the water flow rate through the return pipe 64. The two flow rates would most likely change relative to each other depending upon which faucet 50, 52, 54 and 60 in the system is open and the number of faucets that are open.

Check valves are used in some systems to control the flow of water between two flow paths. Check valves will not work in the hot water system described above. The pressure differentials due to the changes in water temperature and water elevations are too small to reliably open or close a check valve in a pumpless system.

Figure 2:
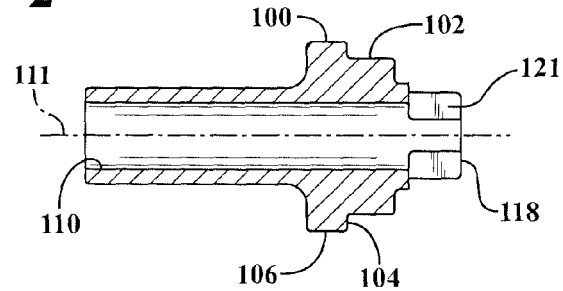
FIG. 2 is a sectional view of an injection molded plug of the directional flow control device.
Figure 4:
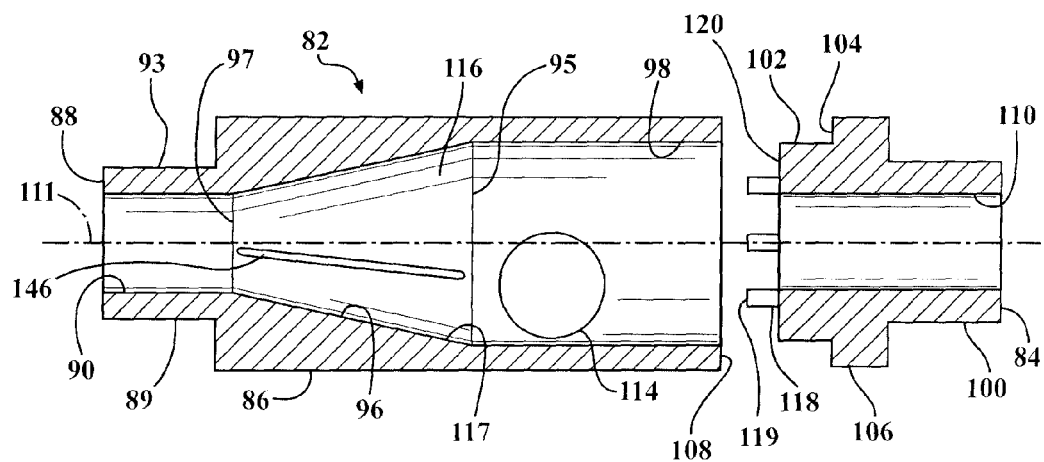
FIG. 4 is an enlarged expanded sectional view of a low back pressure mono directional flow control device.
Figure 6:
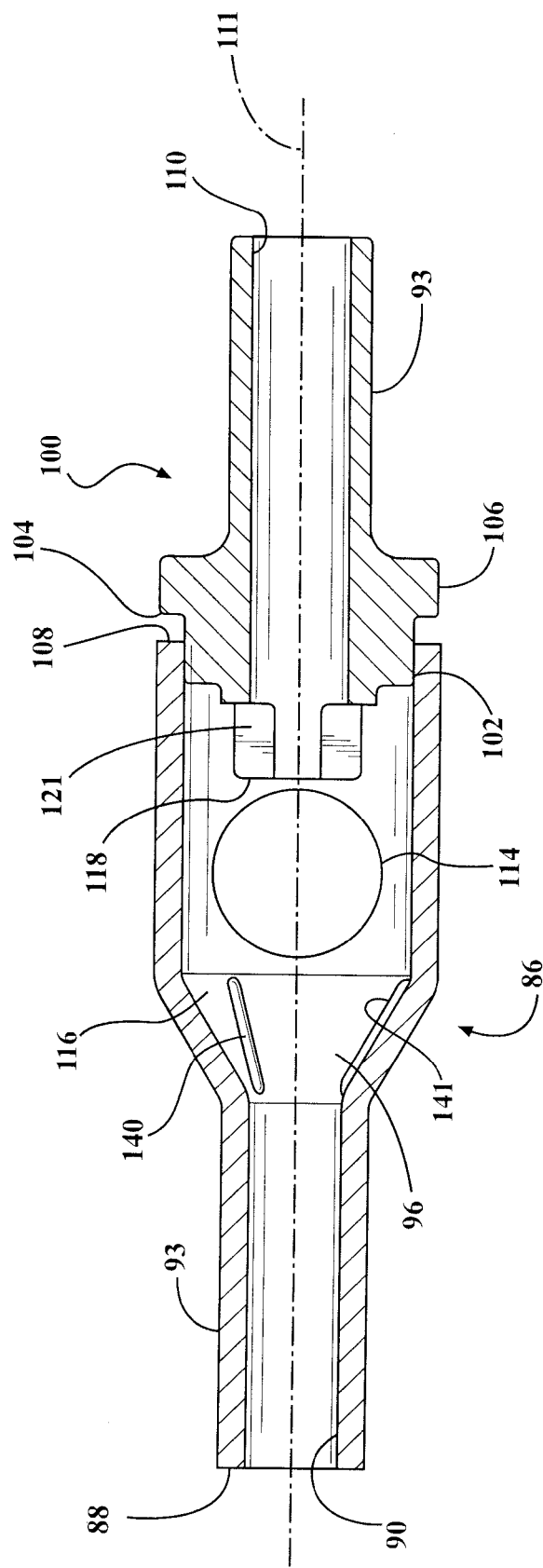
FIG. 6 is a sectional view of an injection molded low back pressure mono directional flow control device.

The directional flow control device 82 includes a device body 86 made of CPVC or other suitable material. The directional flow control device 82, as shown in FIG. 4 is machined from blocks. The directional control device 82, as shown in FIGS. 2, 3 and 6, is injection molded. An inlet end 88 of the device body 86 includes an inlet bore 90 in a tubular portion 89 and a cylindrical outer surface 93. The interior of the device body 86 includes a conical bore portion 96 and a cylindrical bore portion 98. The tubular portion 89 joins the small diameter end 97 of the conical bore portion 96. The large diameter end 95 of the conical bore portion 96 joins the cylindrical bore portion 98. A plug 100 has a cylindrical portion 102 with a diameter that is the same as the diameter of the cylindrical bore portion 98 in the device body 86. The cylindrical portion 102 of the plug 100 is telescopically inserted into the cylindrical bore portion 98 until a radial surface 104 on a flange 106 engages an end surface 108 on the device body 86. An outlet bore 110 through a plug tubular portion 100 is coaxial with the inlet bore 90 in the inlet end 88 of the device body 86. The conical bore portion 96, the cylindrical bore portion 98 and the bore 110 through the plug 100 have a common central axis 111.

A sphere 114 of a material such as nylon is inserted into the conical bore portion 96 and the cylindrical bore portion 98 before the plug 100 is telescopically inserted into the cylindrical bore portion 98 as explained above. An adhesive may be employed to hold the plug 100 in the cylindrical bore portion 98 and retain the sphere 114 in the device body 86. If the plug 100 and device body 86 are made from a material that cannot be joined by adhesives, a different joining system is employed.

The sphere 114 has a diameter that is larger than the inlet bore 90, the small diameter end 97 of the chamber 116 defined by the conical bore portion 96, and the outlet bore 110. The sphere 114 also has a sphere diameter that is smaller than the large diameter end 95 of the conical bore portion 96. A plurality of projections 118 on the end surface 120, of the plug 100 facing the conical bore portion 96, are adjacent to the outlet bore 110, and extend away from the end surface 120. These projections 118 contact the plastic sphere 114 and prevent the sphere from closing the outlet bore 110. The projections 118 are spaced apart and extend axially toward the chamber 116 so that the sphere 114 does not impede the flow of water through the return pipe 64 and into the lower portion of the water tank 14. The cross section area of the cylindrical bore portion 98 is at least two times the cross section area of the sphere 114 to insure that the sphere does not impede flow through the cylindrical bore portion. The projections 118 have sphere engaging surfaces 119 that maintain sufficient space between the sphere 114 and the outlet bore 110 to insure that the sphere does not impede flow into the outlet bore through the plug 100. There may be two projections 118 separated by a slot 121 as shown in FIG. 2. The slot 121 has a slot width normal to the central axis 111 that nearly as large as the diameter of the outlet bore 110.

The return pipe 64 has a capacity that insures there is return water flow to the tank 14 due to temperature changes in the hot water supply pipe and the return pipe. A ¾ inch diameter hot water supply pipe 42 and a ½ inch diameter return pipe 64 work well. Pipes with other inside diameters will most likely work if they provide adequate flow rates. When one or more of the faucets 50, 52, 54 and 60 are opened, to dispense hot water for use, water flows out of the system and cold water flows into the system through the water inlet 22. The water in the tank 14 of the hot water heater 12 tends to be forced out of the tank through both flow passages including supply pipe 42 and return pipe 64 connected to the hot water heater 12. As a result cold water tends to exit the tank 14 through the return pipe 64. Flow through the return pipe 64 is reversed. Flow through hot water discharge opening 24 and into the hot water supply pipe 42 is reduced. The dual flow paths could result in cold water and hot water mixing and warm water passing through one of the faucets. The dual flow paths could also result in cold water flowing through one of the faucets and hot water flowing through another one of the faucets. The sphere 114 of nylon is moved toward the inlet end 88 by back flow from the tank 14. The sphere 114 engages the conical bore portion 96 and restricts flow through the directional flow control device 82 including the chamber 116.

Three ribs 140, 141 and 143 are provided on the conical bore portion 96. The ribs 140, 141 and 143 are spaced apart 120° from each other about the axis 111 as shown in FIGS. 3 and 6. Each rib 140, 141 and 143 is radially spaced from the axis 111 and parallel to one of three planes that include axis 111. The conical bore portion 96 has inside surfaces that extend from the device bore 90 at an angle 150 of thirty degrees from the axis 111 as shown in FIG. 3. Each rib 140, 141 and 143 has a radial height of less than 0.030 inches. The ribs 140, 141 and 143 permit some water to bypass the sphere 114 when one of the faucets 50, 52, 54 and 60 is opened. The ribs 140, 141 and 143 insures that a pressure differential does not lock the sphere 114 in the small diameter end 97 of the conical bore portion 96. The angle 150 of the conical bore portion 96 shown in FIG. 3, insures that friction does not hold the sphere 114 is the small diameter end 97 of the conical bore portion. The slight leakage between the sphere 114 and the conical bore portion 96 when a faucet 50, 52, 54 or 60 is open has minimal effect on the temperature of hot water passing through open faucets. One or more grooves 146 may provide the same function as the ribs 140, 141 and 143. The groove 146 is shown in FIG. 4.

Closing the open faucets 50, 52, 54 and 60 will stop the flow of potable water through water inlet opening 22. The force of water equalized on both sides of the sphere 114 by water will permit the sphere 114 to move to an open position with the assistance of gravity or water flow.

The sphere 114 made of nylon or a similar plastic member is relatively light weight and can be moved by water with a low flow rate. As a result, the low impedance directional control device 82 may be in a vertical position, a horizontal position or a position between horizontal and vertical. The low impedance directional control device 82 may also be mounted in any position in the return pipe 64.

A sphere 114 may also be made from a material such as glass. With a glass sphere, the central axis 111 of the directional flow control device 82 should be nearly horizontal. A glass sphere 114 will require somewhat more water flow to be moved into a flow reducing position adjacent to the small diameter end 97 of the conical bore portion 96 than a lighter weight sphere.

The angle 150 can vary from thirty degrees. However, a sphere 114 has stuck in the position adjacent to the small diameter end 97 of the conical bore portion 96 when the angle 150 was twenty degrees. The angle 150 should therefore be larger than twenty degrees. There is a maximum angle 150. A sphere 114 may not move to a position coaxial with the central axis 111 if the angle 150 is ninety degrees.

A metering valve 130, shown in FIG. 5 is connected to the inlet and 88 of the directional flow control device 82 and the return pipe 64 as shown in FIG. 5. The metering valve 130 is preferably a CPVC valve with integral connectors for connection to the return pipe 64 and to the directional flow control device. The metering valve 130 is employed to control the rate of water return flow through the directional flow control device 82 and into the bottom end 20 of the hot water heater 12. The return flow rate is self regulating to some extent in that as the temperature of return water to the bottom of the tank 14 increases the pressure difference decreases. If the temperature of water returned to the tank 14 is the same as hot water passing out through the discharge opening 24, the flow of water through the return pipe 64 will stop. However, an attempt to hold the return water close to the hot water discharge temperature from the hot water tank 14 will require the addition of substantial heat. In most homes, maintaining a water flow rate that maintains a water temperature drop of 20° F. between the return pipe inlet end 66 and the return pipe discharge end will provide satisfactory results. If a home owner is to be away for some time the return valve 76 or metering valve 130 can be closed. The metering valve 130 is positioned in a relatively easy place to reach. The return valve 76 is close to the bottom of the hot water heater 12 and may be more difficult to adjust or close. The metering valve 130 can be closed to prevent the entry of air into the return pipe 64 when discharging water from the bottom end 20 of the hot water heater 12 through the open return valve 76 and the open drain valve 80.

The directional flow control device 82 can be located anyplace in the return pipe 64. It is however generally desirable to mount the flow control device near the hot water heater 12 where most of the system components are located.

The water conserving prompt hot water supply system 10 can be added to most existing home, office and other facilities. These systems 10 can be sold as kits. Each kit might contain a hot end assembly including one T-coupler, and a cold end assembly, including one metering valve 130 connected to one directional flow control device 82, connected to one elbow 126, connected to one T-coupler 78, to which is connected one drain valve 80, and either one female hose connector 128 or one ¾ inch male NPT threaded connector. Additional fittings and pipe can be added to the supply system if desired.

I claim:

1. A natural resource conserving prompt hot water system comprising:
   a hot water tank including a tank body a tank top end, and a tank bottom end;
   a water inlet opening in the hot water tank connected to a water system supply pipe;
   a hot water discharge opening in the tank top end;
   a drain opening in the tank body adjacent to the tank bottom end;
   a hot water supply pipe with an inlet end connected to the hot water discharge opening in the hot water tank and extending away from the hot water tank to a supply pipe remote end;
   a plurality of point of use pipes each of which connects a hot water discharge faucet to the hot water supply pipe;
   a return pipe including a return pipe inlet end connected to the hot water supply pipe adjacent to the supply pipe remote end and with at least one of the plurality of point of use pipes between the return pipe connection to the hot water supply pipe and the hot water discharge opening in the tank top end, and a return pipe discharge end connected to the drain opening in the tank body, an inside diameter of the return and an inside diameter of the hot water supply pipe are substantially the same and wherein the increase in water density between cooled water high density at the return pipe discharge end and low density hot water at the hot water discharge opening in the hot water tank results in flow of low density hot water from the hot water tank and into the hot water supply pipe and flow of high density cool water from the return pipe and into the drain opening in the tank body thereby forming a pumpless circulation system that maintains hot water in the hot water supply pipe;
   a directional flow control device controlling the direction of flow through the return pipe end including a body, a conical bore portion in the body, an inlet end with an inlet bore that joins a small diameter end of the conical bore portion, a cylindrical bore portion in the body that joins a large diameter end of the conical bore portion, a plug having a plug tubular portion and an outlet bore through the plug tubular portion, a cylindrical plug portion received in the cylindrical bore portion and fixed to the body to form a chamber, an axis of the directional flow control device that is coaxial with the inlet bore, the conical bore portion, the cylindrical bore portion and the outlet bore through the plug and wherein the conical bore portion includes a conical wall surface that extends from the small diameter end to the large diameter end of the conical bore portion at an angle relative to the axis of more than 20 degrees;

a nylon sphere positioned in the chamber of said directional control device movable by water flow in a first direction toward at least one projection in the chamber that limits movement of the nylon sphere toward the outlet bore and permits uninhibited water flow through the chamber, and movable by water flow in a second direction generally parallel to the axis and into the conical bore portion, in response to opening one of the hot water discharge faucets, and limiting flow of water through the inlet bore and into the hot water supply pipe;

a fluid bypass between the nylon sphere and the conical bore portion that equalizes pressure to release the sphere upon closing of the hot water discharge faucets; and wherein the directional flow control device is between the return pipe inlet end and the drain opening in the tank body.

2. A natural resource conserving prompt hot water system, as set forth in claim 1, wherein water received in the hot water tank from the water supply pipe is at an elevated pressure.

3. A natural resource conserving prompt hot water system as set forth in claim 1, wherein the conical wall surface that extends from the small diameter end to the large diameter end of the conical bore portion at an angle of thirty degrees relative to the axis.

4. A natural resource conserving prompt hot water system, as set forth in claim 1, wherein the fluid bypass between the nylon sphere and conical bore portion includes at least three ridges that extend radially inward toward the axis, are spaced one hundred and twenty degrees apart about the axis and extend from the inlet end of the conical bore portion toward the cylindrical bore portion.

5. A natural resource conserving prompt hot water and system as set forth in claim 4, wherein each of the three ridges extends radially inward toward the axis a distance of thirty thousands of an inch.

6. A natural resource conserving prompt hot water system, as set forth in claim 1, wherein the fluid bypass between the nylon sphere and the conical bore portion includes at least three ridges that extend radially inward toward the axis, are spaced one hundred and twenty degrees apart about the axis and extend from the outlet end of the conical bore portion toward the inlet end of the conical bore portion.

7. A natural resource conserving prompt hot water system, as set forth in claim 1 including a valve in the return pipe that controls the minimum temperature of water flowing from the return pipe into the hot water tank.

8. A natural resource conserving prompt hot water system, as set forth in claim 1, including a metering valve in the return pipe that controls the maximum flow rate of water returned to the hot water heater from the return pipe.

\* \* \* \* \*